(No Model.)

F. E. BAKER.
SHAWL STRAP HANDLE.

No. 314,509.        Patented Mar. 24, 1885.

Witnesses:
Dayton A. Doyle
G. H. Simmons

Inventor
Frank E. Baker,
by
Atty.

UNITED STATES PATENT OFFICE.

FRANK E. BAKER, OF AKRON, OHIO.

SHAWL-STRAP HANDLE.

SPECIFICATION forming part of Letters Patent No. 314,509, dated March 24, 1885.

Application filed November 12, 1884. (No model.)

*To all whom it may concern:*

Be it known that I, FRANK E. BAKER, a citizen of the United States, residing at Akron, in the county of Summit and State of Ohio, have invented a new and useful Improvement in Shawl-Strap Handles, of which the following is a specification.

My invention has relation to improvements in the construction of shawl-strap handles of rigid material, and having a handle, a bar, and two strap-loops.

The object of my invention is to provide a shawl-strap handle that shall be light, ornamental, strong, and clean.

Figure 1:
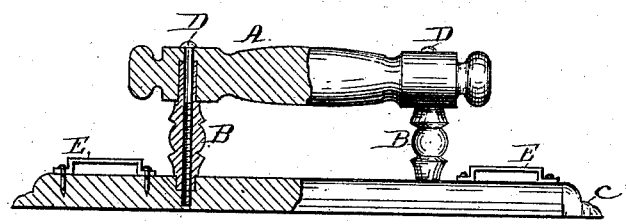
Figure 2:

My invention is illustrated in the accompanying drawings, in which Figure 1 is a side elevation, the left half shown in vertical central section; Fig. 2, an end elevation.

The handle A, posts B B, and bar C are constructed of hard wood, preferably hard maple, beech, or cherry, the ends of the posts B B being tenoned and entering corresponding mortises in the handle and bar. The parts are securely held in place by screws D D, passing through the handle and posts into the bar. The whole is then coated with enameling-varnish and baked in an oven until the enamel is thoroughly hardened. The metallic loops E E are then fastened on the bar by short nails or tacks.

I claim as my invention—

As an improved article of manufacture, a shawl-strap handle consisting of a handle, a bar, and two posts, all of wood, mortised together, held by metallic screws, and enameled, substantially as shown, and for the purpose specified.

In testimony that I claim the foregoing I have hereunto set my hand this 7th day of August, A. D. 1884.

FRANK E. BAKER.

Witnesses:
   C. P. HUMPHREY,
   DAYTON A. DOYLE.